United States Patent [19]

Masuda

[11] 4,447,801

[45] May 8, 1984

[54] TROUBLE SHOOTING METHOD OF VEHICLES

[75] Inventor: Yutaka Masuda, Fukuroi, Japan

[73] Assignee: Yamaha Hatsudoki Kabushiki Kaisha, Iwata, Japan

[21] Appl. No.: 299,508

[22] Filed: Sep. 4, 1981

[30] Foreign Application Priority Data

Sep. 6, 1980 [JP] Japan ............................... 55-123730

[51] Int. Cl.[3] ............................................. B60Q 1/00
[52] U.S. Cl. .................................. 340/52 F; 340/516
[58] Field of Search ..................... 340/52 F, 52 E, 516

[56] References Cited

U.S. PATENT DOCUMENTS

| | | | |
|---|---|---|---|
| 4,031,527 | 6/1977 | Yanagishima et al. | 340/52 F |
| 4,034,336 | 7/1977 | Arai | 340/52 F |
| 4,222,031 | 9/1980 | Okamoto et al. | 340/516 |
| 4,277,772 | 7/1981 | Kastura et al. | 340/52 F |

*Primary Examiner*—David L. Trafton
*Attorney, Agent, or Firm*—Ernest A. Beutler

[57] ABSTRACT

A method and apparatus for monitoring a plurality of vehicle conditions and providing an indication of unsatisfactory conditions. A warning indicator is provided for each condition and a main warning indicator is also provided for giving warning when any of the sensed condition is not correct. An arrangement is provided wherein all of the warning indicators are illuminated when the main switch of the vehicle is closed so that the operator may ascertain that all warning systems are operational. The individual warning indicators are then operated in sequence and are extinguished if the sensed condition is correct. If any sensed condition is not correct, the main indicator will be illuminated and that particular condition indicator will remain illuminated while the remaining checks are completed. This sequential testing is done only after the vehicle is started or if initiated by the operator. The operator is also provided with an override which permits change in the mode of the main warning indicator once it has been initially operated.

14 Claims, 3 Drawing Figures

TROUBLE SHOOTING METHOD OF VEHICLES

BACKGROUND OF THE INVENTION

This invention relates to a trouble shooting method of vehicles amd more particularly to an improved method and apparatus for monitoring a plurality of vehicle conditions.

As is well known, it has been proposed to provide a variety of vehicles with warning devices for detecting malfunctions in certain components of the vehicle. Normally, such warning devices provide a visual indication of malfunction only when such a malfunction occurs. Occasionally it has been suggested to illuminate all of the warning devices or a number of them simultaneously with turning on of the ignition switch of the vehicle. However, the operator frequently tends to ignore such simultaneous illumination or is incapable of assuring that all of the various warning devices are illuminated at one time. As a result, there is a fairly substantial distrust of such warning devices and operators tend to ignore them as a matter or course.

It is, therefore, a principal object of this invention to provide an improved vehicle trouble shooting method and apparatus wherein the functioning of the various condition indicators may be monitored before vehicle is operated.

It is another object of this invention to provide a system and method whereby the operation of a plurality of vehicle warning systems may be checked both simultaneously and sequentially before the vehicle is operated so as to give rise to greater operator confidence.

In many instances a vehicle warning system may be operated and the operator may wish to either change the mode of warning or discontinue it once he has noted the existence of a predetermined condition. No previously proposed system has permitted such recognition of a problem and subsequent modification of the form of malfunction indication.

SUMMARY OF THE INVENTION

A first feature of the invention is adapted to be embodied in the method of monitoring a plurality of vehicle conditions by means of individual warning devices for each of the conditions. The method comprises the steps of simultaneously operating all of the warning devices when the main vehicle switch is closed, sensing the starting of the vehicle and sequentially operating each of the warning devices and subsequently deactivating each warning device if the condition monitored is correct.

Another feature of the invention is adapted to be embodied in a monitoring system for a plurality of vehicle conditions. The monitoring system comprises a plurality of warning devices for each of the conditions. The system includes means for simultaneously operating all of the warning devices when a main vehicle switch is closed, sensing the starting of the vehicle engine and subsequently operating each of the warning devices and deactivating each device in sequence if the condition monitored is correct.

Yet another feature of the invention is adapted to be embodied in a vehicle warning system having an indicating means with a normal mode and a warning mode for providing a warning of a predetermined condition. Sensing means sense the predetermined condition and activate the indicating means to its warning mode. In accordance with this feature of the invention, means are provided for permitting an operator to change the mode of the indicating means from its warning mode to another mode only after the sensing means has sensed the predetermined condition.

DETAILED DESCRIPTION OF THE PREFERRED EMBODIMENT

Figure 1:
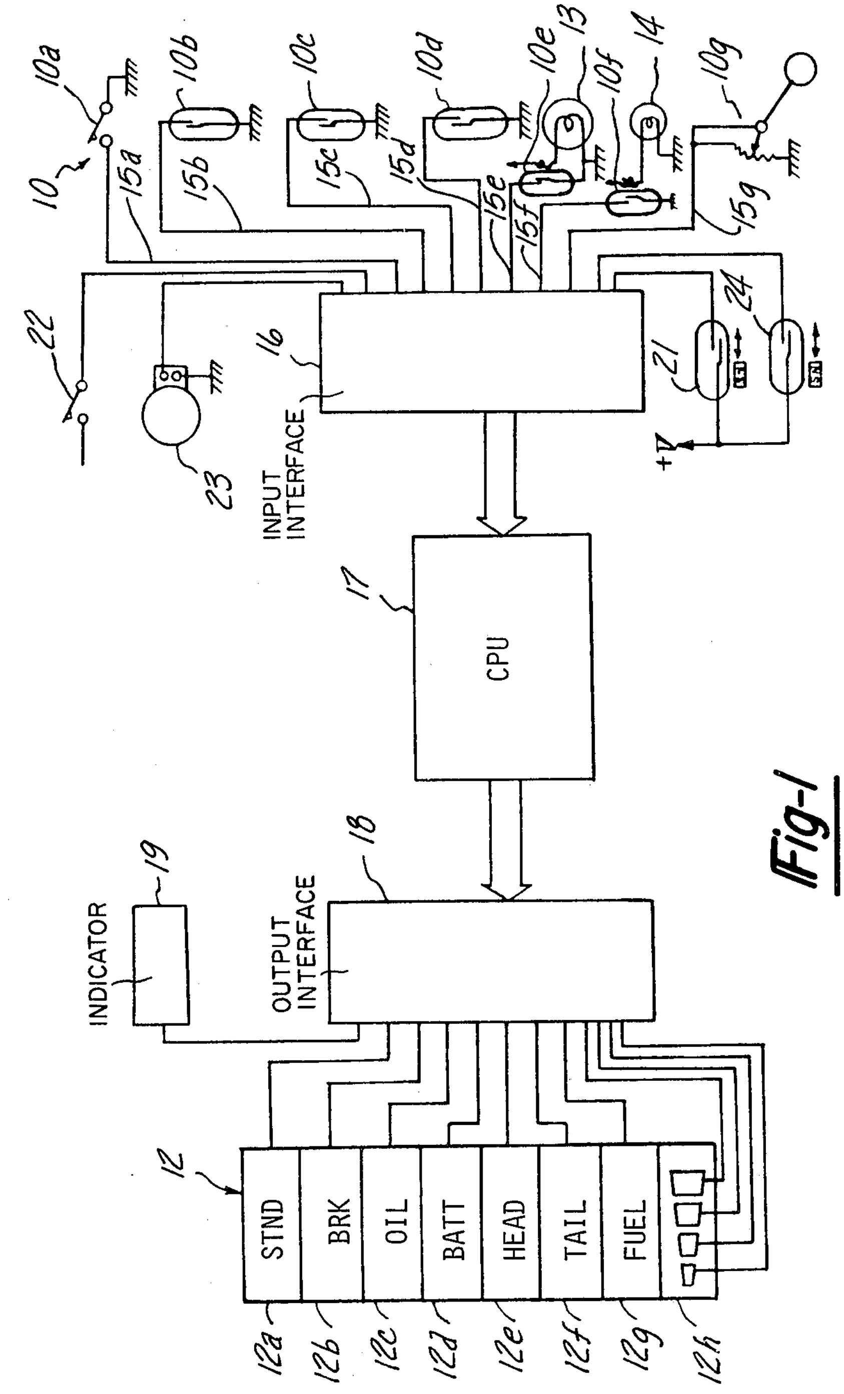
FIG. 1 is a schematic diagram illustrating an embodiment of the invention.

Referring first to FIG. 1, a vehicle monitoring system is illustrated in part schematically. The monitoring system includes a plurality of sensors, indicated generally by the reference numeral 10, which operate a number of associated warning lights 12 which are positioned in a location where they may be readily viewed by a vehicle operator by means of a system to be described. The sensors 10 include a main stand indicator **10*a*, brake fluid level sensor 10*b*, engine oil level sensor 10*c*, a battery electrolyte sensor 10*d*, a headlight sensor 10*e*, a taillight sensor 10*f* and a fuel level sensor 10*g*. The stand sensor 10*a* comprises a switch which is closed when the stand is extended and opened when it is raised. The fluid sensors 10*b*, 10*c* and 10*d* may be of any known type such as those embodying a float mounted permanent magnet or the like. The light sensors 10*e* and 10*f* are operative to indicate if there is an open circuit in the headlight, indicated by the reference numeral 13, or in the taillight, indicated schematically by the reference numeral 14. Such an open circuit could be caused by a burned out filiment or another defect in either the head or tail light circuits. The fuel level gauge 10*g*** is of the float operated variable resistance type as indicated by the schematic illustration.

The output leads **15*a*, 15*b*, 15*c*, 15*d*, 15*e*, 15*f* and 15*g* of the respective sensors are connected to an input interface 16 of a central processing unit (CPU) 17. The CPU is preferably a micro computer of the single chip type. From the CPU 17 a signal is transmitted to an output interface 18 which, in turn, controls the illumination of the various warning lights 12*a* through 12*f*, a fuel warning light 12*g* and a fuel level indicator 12*h*. The input interfact 16 converts the signal from the various sensors 10*a* through 10*g* to the necessary input signals for the CPU 17. The CPU 17 arithematically processes these input signals in accordance with an appropriate program which has been stored therein so as to successively light or extinguish the warning lights 12*a* through 12*g*, as will become apparent. In addition, the fuel level display 12*h* has its lighting area decreased in proportion to the amount of fuel which has been consumed, as sensed by the level sensor 10*g*. When the fuel falls below a predetermined value, the warning sensors 12*g* associated with the fuel will be illuminated. The indicators 12*a* through 12*h* are preferably of the liquid crystal type. The warning lights 12*a* will be illuminated when the stand is down. The warning lights 12*b*, 12*c* and /or 12*d* will be illuminated when the brake fluid, engine oil level and battery levels fall to a predetermined value. The warning indicator 12*e*** will be illuminated if there is a failure in the headlight circuit and warning indicator 12*f* will be illuminated if there is a failure in the brake light circuit.

The CPU 17 also is programmed to illuminate a main warning indicator 19 at the same time that any of the warning indicators 12*a* through 12*g* are illuminated. The CPU 17 is programmed so as to normally cause the warning indicator 19 to flash on and off but, as will be described, an override for this control is provided that will permit the operator to selectively maintain the warning indicator 19 in an "on" condition or, alternatively, to extinguish the warning indicator 19. The control for the override of the warning indicator 19 is provided by means of an operator acivated warning control 21. In the schematic representation the number 21 is shown in circuit with the input interface 16

The input interface 16 also is adapted to receive a signal from the main switch 22 of the associated vehicle. This indicates that the main switch is closed which initiates the checking sequence to be described. An alternator 13 of the vehicle is also in circuit with the input interface 16 so as to indicate when the engine associated with the vehicle is running.

In addition to the aforenoted control and connections, there is also provided a checking switch 24 that may be activated by the vehicle operator so as to initiate at operator control the checking function of the device.

Figure 3:
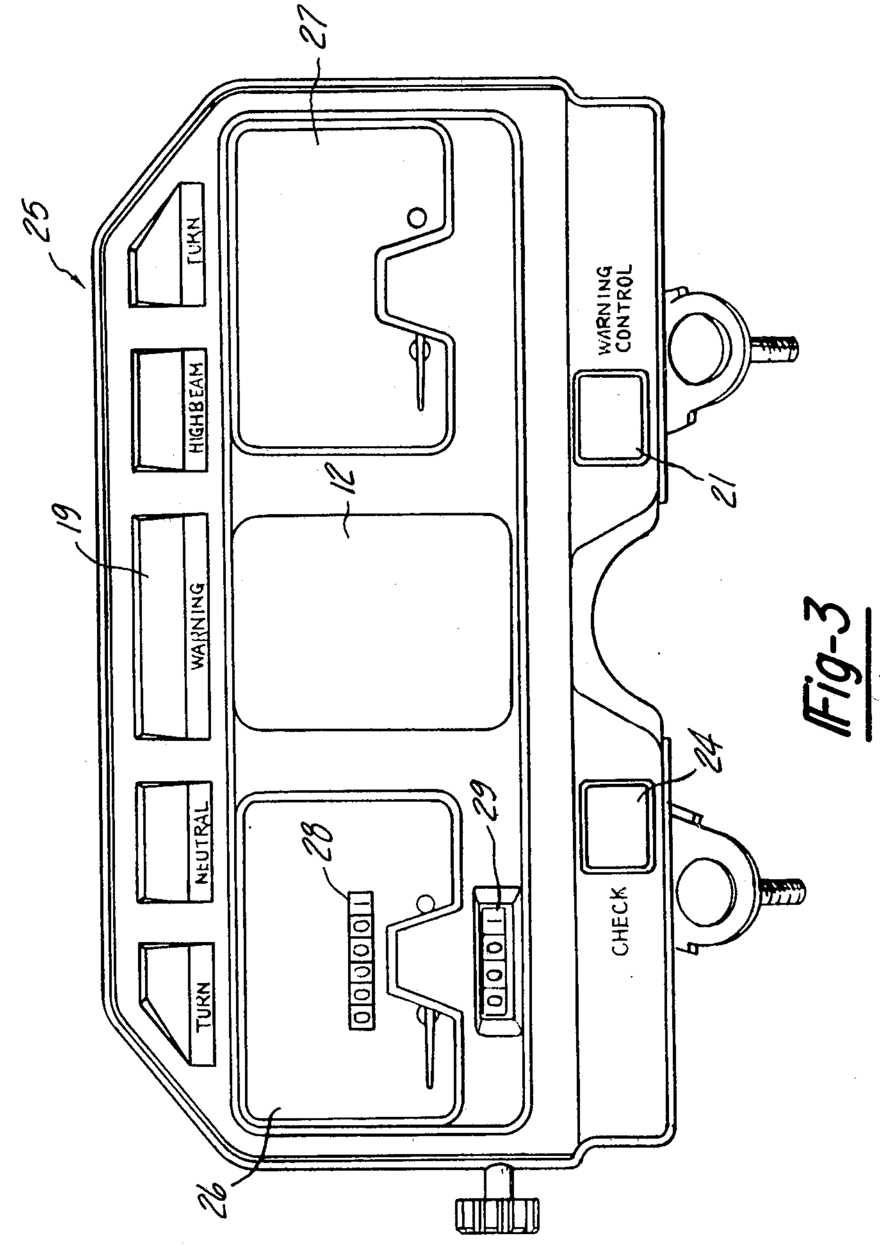
FIG. 3 is a plan view showing the instrument panel of a motorcycle incorporating the embodiment.

FIG. 3 illustrates how the indicating system constructed in accordance with the invention may be integrated into an instrument panel 25 of a motorcycle. The warning indicators 12*a* through 12*g* and the fuel level gauge 12*h* are positioned in a display array between a speedometer head 26 and a tachometer head 27. The speedometer 26 includes an odometer 28 and trip odometer 29. The warning control switch 21 is positioned beneath the tachometer 27, and the checking initiation switch 24 is located beneath the speedometer 26. The main warning indicator 19 is positioned in a separate area from the indicators 12*a* through 12*h* but directly above them and at the center upper portion of the instrument panel 25 so as to be located to immediately attract the operator's attention.

Figure 2:
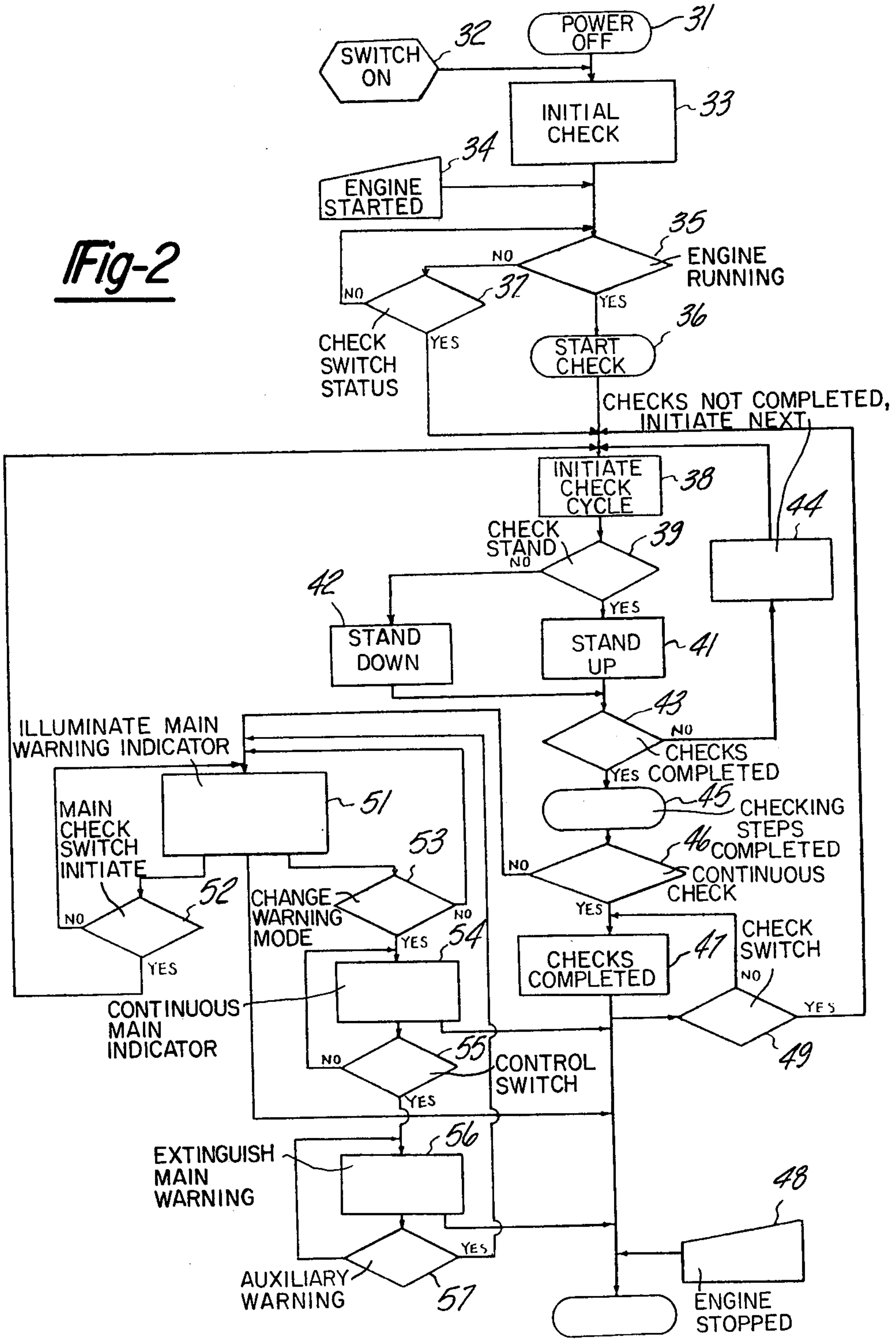
FIG. 2 is a flow chart illustrating the operation of the embodiment of FIG. 1.

The warning system is constructed so as to provide an initial illustration of all of the warning devices 12*a* through 12*g* and the fuel level gauge 12*h* as well as the main warning indicator 19 immediately upon closure of the main vehicle switch 22. Thus, the operator will be given a visual indication that all warning systems are operative and that the display devices associated with each system are operative. Once this initial check is made and the motorcycle engine is started, as sensed by the output voltage of the alternator 23 for a predetermined period of time, a checking sequence will follow wherein the warning indicators 12*a* through 12*g* are illuminated in sequence. If each condition being sensed is operative, the illumination of the indicator will be terminated and the next indicator illuminated. In the event any system being checked is not in the desired condition, this indicator will remain illuminated and the main warning indicator 19 will be illuminated. In that event, the system will complete the checking of the remaining indicators. The operation of this checking system may be understood by reference to the flow diagram, FIG. 2.

The block 31 indicates the condition when the main switch 22 is open and the entire system is deactivated. When the main switch 22 is closed by the operator to initiate the operation of the motorcycle as indicated by the block 32, a signal is directed to the CPU 17 through the input interface 16 and the checking program is initiated by illumination of all of the warning devices 12*a* through 12*g* and complete illumination of the fuel lever indicator 12*h*, as well as the main warning indicator 19. This initial check, indicated by the block 33, permits the operator to ascertain that all warning circuits and the fuel level gauge 12*h* are fully operative. If any of the displays 12*a* through 12*h* or 19 are not illuminated, the operator can immediately ascertain which, if any, of the systems are inoperative. This can be borne in mind by the operator during the subsequent individual checking of the various warning devices and the system associated therewith. This also provides the operator with an indication that the defective system should be corrected.

Once the main switch 22 is closed and the engine associated with the vehicle is started, as indicated by the block 34, the alternator 23 will generate a voltage. If the voltage is generated by a predetermined number of seconds, as determined by the initial programming of the CPU 17 indicated by the block 35, the sequential checking operation will be initiated by the generation of a signal, indicated by the block 36.

In the event the engine is not started, as indicated by the failure of the alternator 23 to generate a voltage for the predetermined number of seconds, the CPU 17 is programmed to determine the status of the checking switch 24 as indicated by the block 37. If the checking switch 24 is in an "off" condition, the CPU 17 reads the status to await the generation of the voltage from the alternator 23 for the predetermined period of time indicated by the block 35, as indicated by the "NO" line in FIG. 2. The sequential checking of the various devices will then not be initiated until the engine starts. If the checking switch 24 is in its "on" condition, the CPU 17 will initiate the checking sequence as indicated by the line "YES" in the diagram of FIG. 2 even though the engine has not started.

When the checking sequence is initiated by the CPU 17 either as a result of sensing of the starting of the engine or as a result of the engine not having started by the closure of the checking switch 24, the stand indicator 12*a* is illuminated by the CPU 17 and the remaining indicators 12*b* through 12*h* are extinguished, as is the main indicator 19. This checking step is indicated by the block 38 in FIG. 2.

When the stand indicator 12*a* is illuminated, the CPU 17 is programmed to determine if the stand switch 10*a* is opened or closed, as indicated by the block 39. If the switch 10*a* is opened, indicating that the stand is in its elevated, running condition, a YES signal is generated by the CPU 17 so as to terminate the illumination of the stand indicator 12*a* after a predetermined number of seconds, as indicated by the block 41. If, on the other hand, the stand switch 10*a* is closed, indicating that the stand is still in its down or standing position, a malfunction is indicated, as indicated by the block 42 in the NO circuit from the block 39. The display 12*a* is then maintained in an ON condition until the main switch 22 is again opened. At the same time that the stand indicator 12*a* is left illuminated by indication of the condition of the stand in its down or standing position (block 42), the main warning indicator 19 will be flashed alternately on and off by the CPU 17. This insures tht the operator will not overlook the continued lighting of the stand indicator 12*a*.

Once the completion of the checking of the condition of the stand and its indicator 12*a* has been completed, and regardless of whether the stand has been sensed in either its up, operative or its down, standing condition, the CPU 17 senses if all of the checking steps have been completed, as indicated by the block 43. If all of the checking steps have not been completed, as indicated by the NO line from the block 43, the next checking step, that of the level of brake fluid, is initiated as indicated by the block 44. The checking sequence is again repeated as indicated by the block 38 by the CPU 17 in accordance with its program.

That is, the indicator **12*b* for the brake fluid level is illuminated for a predetermined period of time and if the brake fluid level is satisfactory as indicated by the sensor 10*b*, the brake fluid indicator 12*b* is extinguished. As with the stand indicator, if the brake fluid level sensor 10*b* indicates insufficient brake fluid in the reservoir, the brake fluid indicator 12*b* is kept in an ON condition and the warning indicator 19** will be flashed continuously.

The CPU 17 continues on through its programmed check of the oil level, battery elctrolyte level, head and tail light condition and fuel level through the successive illumination of the indicators **12*c* through 12*g* and then extinguishing of them if the condition indicated is satisfactory. As aforenoted, if any or all of these conditions are unsatisfactory, the respective indicator 12*c* through 12*g* will be maintained in its on or indicating condition and the main warning indicator 19** will be flashed.

Once the scanning steps of checking all of the indicating circuits has been completed, regardless of whether or not any of the sensed conditions have been indicated as unsatisfactory, the computer program is completed and the scanning steps are terminated by the line YES from block 43 to the termination of the steps, as indicated by the block 45. If any malfunctions have been indicated, the respective indicators **12*a* through 12*g* will be maintained illuminated and the main warning indicator 19 will continue to flash. These steps of sequentially checking each of the indicators 12*a* through 12*g* are handled completely automatically by the CPU 17** when the starting of the engine has been sensed by determining an output of alternator voltage for the predetermined period of time, as has been previously noted.

After the aforedescribed scanning strokes have been completed, the sensors **12*a* through 12*g* continue to monitor the respective functions and if any condition becomes unsatisfactory, the respective indicator 12*a* through 12*g* will be illuminated, as indicated by the block 46. Also, the fuel level will be continuously monitored by the indicator 12*h*** so as to provide an indication of the amount of fuel remaining in the fuel tank.

If all conditions being monitored have been indicated as being satisfactory at the completion of the checking steps, all of the display panels **12*a* through 12*g* and the main warning indicator 19 will be extinguished, as indicated by the block 47 and this state is maintained until the engine is stopped, as indicated by the block 48. Also, if any malfunction has been indicated and neither the checking switch 24 nor the warning control switch 21 has been activated, the respective malfunction indicator 12*a* through 12*g* will remain illuminated and the main warning indicator 19 will continue to flash until the main switch 22 is opened, as indicated by block 48**.

Any time during the operation of the motorcycle, the rider may reinitiate the checking function so as to again operate in sequence each of the indicators **12*a* through 12*g*. Thus, during the operation the operator may ascertain that the sensors 10*a* through 10*g* and the associated indicators 12*a* through 12*g* are operative by activating the checking switch 24, as indicated by the block 49. The checking sequence as aforedescribed will then be repeated. That is, the indicators 12*a* through 12*g* will illuminate in sequence so that the operator may ascertain that the system is operative. After illumination for the predetermined period of time, the respective indicator 12*a* through 12*g* will be extinguished, and the next successive indicator will be illuminated. If at any time during the initial checking stage, during start of the vehicle, or during a subsequent check by operation of the checking switch 24 or if a malfunction is indicated during operation of the vehicle, one or more of the indicators 12*a* through 12*g* will be illuminated, and the main warning indicator 19 will be sequentially flashed, as indicated by the block 51. If any of the indicators are illuminated, the checking sequence may again be ascertained and repeated by operation of the main checking switch 24 (block 52). The testing sequence is then repeated, as indicated by the YES line from the block 52** in FIG. 2.

At any time when one or more of the indicators **12*a* through 12*g* is illuminated and the main warning indicator 19 is flashing, the operator may selectively change the mode of the main warning indicator 19. As indicated by the block 53, operating of the warning control switch 21 when this condition prevails will cause the flashing of the main indicator 19 to be discontinued with a resulting continuous illumination of the indicator 19, as indicated by the block 54. Thus, the main indicator 19 will be illuminated continuously, as will the respective malfunction indicator 12*a* through 12*g*. Thus, the rider will have been warned of the function and acknowledge this warning. However, the flashing of the indicator 19** will be replaced by a continuous illumination of it.

If the warning control switch 21 is again operated, as indicated by the block 55, the CPU 17 is programmed so as to extinguish the warning light 19, as indicated by the block 56. When this occurs the respective condition warning indicator **12*a* through 12*g* will continue to be illuminated so that the rider will still be aware of the malfunction. However, the warning 19 will now be extinguished and the rider may disregard it. Upon a further actuation of the warning control 24, as indicated by the block 57, the warning indicator or will be actuated to its flashing mode by the CPU 17**.

Thus, it should be readily apparent that the main warning indicator 19 may be selectively controlled to either a flashing, continuously illuminated or off mode by the operator. The operator, however, cannot disable the flashing of the main indicator 19 until he has acknowledged its initial flashing operation and operate the warning control 21. That is, the operator cannot disable the main warning indicator 19 until it has commenced an initial flashing operation. Even if the main warning indicator 19 has been switched off by the operator, the individual warning controls **12*a* through 12*g* will continue to be illuminated until the main switch 22** is turned off.

It should be readily apparent that the described system provides an immediate check of the operation of all warning systems once the ignition switch 22 is turned on. The individual warning circuits will be sequentially tested automatically once the engine starts running. Furthermore, the operator may check all of the warning systems sequentially at any time to determine if they are operational by activating the checking switch 24.

It is to be understood that the preceding description is that of a preferred embodiment of the invention and that various changes and modifications can be made without departing from the spirit and scope of the invention as defined by the appended claims.

I claim:

1. The method of monitoring a plurality of vehicle conditions by means of individual warning devices for each of such conditions comprising the steps of simultaneously operating all of said warning devices for a period of time when a main vehicle switch is closed, sensing the starting of the vehicle engine, and sequentially operating each of said warning devices and subsequently deactivating each warning device if the condition monitored is correct.

2. The monitoring method as set forth in claim 1 wherein the system further includes a main warning device and including the step of operating said main warning device simultaneously with the operating of the individual warning devices when the main vehicle switch is closed and reactivating the main warning device in the event a condition monitored is not correct and an individual warning device is not deactivated.

3. The monitoring method as set forth in claim 2 further including the step of permitting an operator to change the mode of the main warning device only after the main warning device has been activated upon the indication of an incorrect condition by one of the warning devices.

4. The monitoring method as set forth in claim 3 wherein the operator may control the main warning device between either a flashing mode or a continuous mode.

5. The monitoring method as set forth in claim 3 wherein the operator may activate the main warning device between a warning condition and an off condition.

6. The monitoring method as set forth in claim 1 further including the step of permitting the operator to sequentially activate the sequential operation of the warning devices at will.

7. The monitoring method as set forth in claim 6 wherein the system further includes a main warning device and including the step of operating said main warning device simultaneously with the operating of the individual warning devices when the main vehicle switch is closed and reactivating the main warning device in the event a condition monitored is not correct and an individual warning device is not deactivated.

8. The monitoring method as set forth in claim 7 further including the step of permitting an operator to change the mode of the main warning device only after the main warning device has been activated upon the indication of an incorrect condition by one of the warning devices.

9. A monitoring system for a plurality of vehicle conditions comprising a plurality of individual warning devices for each of such conditions, sensing means for sensing each of said conditions to activate the respective of said warning conditions when the sensed condition is incorrect, and means for simultaneously activating all of said warning devices for a period of time when the main vehicle switch is closed, sensing of the running of the vehicle engine, seqentially activating each of said warning devices for a period of time and deactivating such individual warning devices if the condition sensed by the respective sensing means is correct.

10. A monitoring system as set forth in claim 9 further including a main warning device and means for activating said main sensing device simultaneously with activating any of the individual warning devices.

11. A monitoring system as set forth in claim 10 further including main warning control means for changing the mode of said main warning device only after said main warning device has been initially activated.

12. A monitoring system as set forth in claim 9 further including reset means for selectively sequentially operating each of the warning devices and subsequently deactivating each of said warning devices if the condition monitored is correct and independent of the running of the vehicle engine.

13. A monitoring system as set forth in claim 12 further including a main warning device and means for activating said main sensing device simultaneously with activating any of the individual warning devices.

14. A monitoring system as set forth in claim 13 further including main warning control means for changing the mode of said main warning device only after said main warning device has been initially activated.

* * * * *